United States Patent [19]

Bersano

[11] Patent Number: 4,801,418

[45] Date of Patent: Jan. 31, 1989

[54] SEALING COMPOUND

[75] Inventor: Bruno Bersano, Epalinges, Switzerland

[73] Assignee: W. R. Grace & Co., Lexington, Mass.

[21] Appl. No.: 155,334

[22] Filed: Feb. 12, 1988

Related U.S. Application Data

[62] Division of Ser. No. 861,170, May 9, 1986, Pat. No. 4,743,636.

[30] Foreign Application Priority Data

May 28, 1985 [DE] Fed. Rep. of Germany ....... 3519053

[51] Int. Cl.$^4$ ............ B65D 53/06; C09K 3/10; C08K 3/00
[52] U.S. Cl. ................. 264/268; 524/16; 524/426; 524/431; 524/447; 524/451; 524/505; 525/88; 525/95; 525/222
[58] Field of Search ............ 524/16, 426, 431, 447, 524/451, 505, 525; 525/222, 88, 95; 264/268

[56] References Cited

U.S. PATENT DOCUMENTS

| | | | |
|---|---|---|---|
| 3,696,956 | 10/1972 | Merritt et al. | 215/40 |
| 3,879,575 | 4/1975 | Dobbin et al. | 524/525 |
| 3,883,025 | 5/1975 | Jemmett | 215/341 |
| 4,042,555 | 8/1977 | Raimondi et al. | 260/29.6 RB |
| 4,076,698 | 2/1978 | Anderson et al. | 525/348 |
| 4,085,186 | 4/1978 | Rainer | 264/268 |
| 4,133,923 | 1/1979 | Blunt | 525/232 |
| 4,171,561 | 10/1979 | Bainard et al. | 264/268 |
| 4,198,369 | 4/1980 | Yoshikawa et al. | 264/268 |
| 4,256,234 | 3/1984 | Mori et al. | 524/232 |
| 4,268,237 | 5/1981 | Wolters | 264/268 |
| 4,294,733 | 10/1981 | Marzouki et al. | 260/28.5 B |
| 4,312,824 | 1/1982 | Mori et al. | 264/268 |
| 4,411,115 | 10/1983 | Marzouki et al. | 52/309.1 |
| 4,463,116 | 7/1984 | Koyama et al. | 524/232 |
| 4,479,989 | 10/1984 | Mahal | 525/98 |
| 4,500,021 | 2/1985 | Bildaus | 428/35 |
| 4,500,681 | 2/1985 | Shulman | 525/192 |

FOREIGN PATENT DOCUMENTS

| | | |
|---|---|---|
| 9376 | 4/1980 | European Pat. Off. . |
| 32804 | 7/1981 | European Pat. Off. . |
| 1557686 | 2/1969 | France . |
| 2421852 | 11/1979 | France . |
| 055410 | 3/1977 | U.S.S.R. ............... 524/505 |
| 1196123 | 6/1970 | United Kingdom . |
| 1196125 | 6/1970 | United Kingdom . |

*Primary Examiner*—Herbert J. Lilling
*Attorney, Agent, or Firm*—John Dana Hubbard; William L. Baker

[57] ABSTRACT

A PVC-free sealing compound, particularly a sealing compound for use on containers, comprising a mixture of low density polyethylene or linear low density polyethylene; a styrene-isoprene-styrene block copolymer or a thermoplastic elastomeric blend of an ethylene-propylene copolymer such as EPM or EPDM, EVA and process oil, one or more fillers such as talc, and optionally cork powder.

9 Claims, No Drawings

SEALING COMPOUND

This is a division of application Ser. No. 861,170, filed May 9, 1986, now U.S. Pat. No. 4,743,636.

The present invention relates to sealing compounds, particularly sealing compounds suitable for use on container closures.

BACKGROUND

Seals for use on container closures, such as metal crowns, rolled on caps or plastic caps are conventionally made from sealing compounds based on a PVC-plastisol system. Such compounds are usually lined into the closure as a liquid and fluxed to form the seal. Some seals have been formed using a PVC-based compound in which the compound is formed into an extruded form such as pellets which are deposited into the closure and shaped into the appropriate seal by means of a die.

Seals for container closures, such as bottle caps, must have specific characteristics in order to adequately seal a container. The seal must be soft enough so as to adapt to any possible irregularities of the container edge, such as a bottle neck, especially on a reused glass bottle. Simultaneously, the seal must be adequately elastic to maintain the seal between the closure and the container, especially when the container holds a pressurized product, such as beer or tonic. The seals must also serve as barriers to the ingress or egress of water vapor and oxygen. This is especially important in connection with the keeping qualities of beer, which is adversely affected by oxygen. Finally, the seal itself must not alter the taste of the packed product.

PVC-based compounds adequately fulfill these characteristics, though the use of PVC has been objected to because of its waste disposal problems and in particular, because of the health risks which have been claimed from the use of PVC on food packs. There has therefore been an increased demand for compounds which are free of PVC, yet have the same sealing characteristics as PVC.

Some attempts have been made to make sealing compounds based on polyethylene, though have they not gained any widespread acceptance due to their inferior characteristics as compared to PVC-based compounds. Some characteristics have been enhanced through the addition of various additives, but the additives make the compounds so expensive that they are not competitive or marketable.

SUMMARY OF THE INVENTION

The present invention is a relatively inexpensive sealing compound which is PVC-free and has excellent sealing characteristics. The present invention is a polyethlene-based compound containing selected elastomers and suitable fillers.

It is an object of the present invention to provide a low cost, PVC-free sealing compound, preferably for use on container closures, which contains either low density polyethylene or linear low density polyethylene; a styrene-isoprene-styrene block copolymer and/or a thermoplastic elastomer mixture of an ethylene-propylene copolymer, such as EPM or EPDM, EVA and process oil; fillers such as talc, calcium carbonate, kaolin, titanium dioxide and mixtures thereof; and cork powder.

It is a further object of the present invention to provide a PVC-free sealing compound with similar or superior sealing characteristics as PVC-based compounds.

It is another object of the present invention to provide a low density polyethylene-based sealing compound having a styrene-isoprene-styrene block copolymer, one or more fillers and optionally cork powder.

An object of the present invention is a PVC-free sealing compound of linear low density polyethylene, styrene-isoprene-styrene block copolymer and one or more fillers.

A further object is to provide a polyethylene-based sealing compound of polyethylene, such as low density polyethylene or linear low density polyethylene; a styrene-isoprene-styrene block copolymer or a thermoplastic elastomeric mixture of an ethylene-propylene copolymer and EVA and process oil; and one or more fillers; the sealing compound being useful in all applications in which PVC-based sealing compounds are useful.

It is an advantage of the present invention to provide an inexpensive, PVC-free sealing compound which has all of the desirable sealing characteristics of PVC-based compounds, but without the health and environmental disadvantages of PVC.

The invention herein is a PVC-free sealing compound of low density polyethylene or linear low density polytheylene; styrene-isoprene-styrene block copolymer or a mixture of an ethylene-propylene copolymer and EVA and process oil and one or more fillers.

Further objects and advantages of the present invention apparent to those skilled in the art from the description and claims below:

DESCRIPTION

The present invention is a PVC-free sealing compound, preferably for use on container closures, comprising:

(a) from about 75 to about 95 parts by weight of low density polyethylene (LDPE) or linear low density polyethylene (LLDPE);

(b) from about 10 to about 20 parts by weight of a styrene-isoprene-styrene block copolymer and/or a thermoplastic elastomeric mixture of an ethylene-propylene copolymer, such as EPM or EPDM, ethylene vinyl acetate copolymer (EVA) and process oil;

(c) from about 15 to about 50 parts by weight of one or more fillers such as talc, calcium carbonate, kaolin, titanium dioxide and mixture thereof; and optionally;

(d) from about 0 to about 15 parts by weight of cork powder.

Low density polyethylene (LDPE) and linear low density polyethylene (LLDPE) are known from the prior art, so that no further information has to be given as to their composition. For reasons of completeness in connection with LLDPE, it is pointed out that it is not a pure polyethylene, but a copolymer of polyethylene and a small amount of another olefin, such as kaprylene (cf. U.S. Pat. No. 4,076,698, which gives a detailed description of LLDPE, and European Patent Application 9376). A LDPE suitable in the present invention has a melt index of 7 and a melting point of approximately 114° C. A suitable LLDPE for the present invention normally has a melt index of 3.8 to 5.0 and a density of around 0.915. An example of a commercially available LDPE is ESCORENE LD 251 available from ESSO. A commercially available LLDPE used in the present invention is Grade 09-046, from DSM sold by Stamilex.

The styrene-isoprene-styrene block copolymers used according to the invention are linear polymers (also called segmental polymers), in which the ends of polyisoprene chains are in each case terminated by polystyrene segments (cf. U.S. Pat. No. 4,085,186, particularly column 4). Such block copolymers are commercially available with the tradenames CARIFLEX TR-1107 (Shell), or EUROPRENE SOL T 190 (EniChem). The styrene content of the commercially available block copolymers varies from product to product, but is generally between 10 and 40%, so that the isoprene content is from about 60 to about 90%. The aforementioned commercial products preferably have styrene contents of 15 to 25%. It is important that the hardness of these block copolymers is not excessive. Thus, preference is given to those block copolymers with a Shore-A hardness of 20 to 50 and preferably approximately 30.

The thermoplastic elastomeric mixture which may be used instead of the block copolymer is a mixture of an ethylene-propylene copolymer, such as EPM or EPDM and EVA and process oil. Reference is made to European Patent Application 00 32 804 with reference to the thermoplastic elastomeric mixture of substantially EPM or EPDM-elastomer, EVA and process oil suitable in the present invention. A commercial product suitable for the purposes of the invention is ESCORENE ULTRA EX 095 (by ESSO) with a melt index of 1.5 and a Shore-A hardness of approximately 58. These mixtures are also known as elastomeric alloys.

The fillers useful in the present invention are well known to those skilled in the art and are commercially available. A preferred filler is talc, having a particle size of 75$\mu$ (99% passes through a sieve with a 75$\mu$ internal mesh diameter). Other fillers include calcium carbonate, kaolin (also known as china clay or clay) and titanium dioxide. Preferably the latter fillers are in a fine powder form, having a particle size of 50$\mu$ (98 or more % pass through a sieve having an internal mesh diameter of 50$\mu$). Additionally, mixtures of these fillers can be used in the invention. Other fillers, not specifically mentioned herein, but well known to one skilled in the art, could be used in the present invention so long as they do not adversely affect the desired characteristics of the compound.

The amount of filler or fillers used in the present invention ranges from about 15 to about 50 parts by weight with a preferred range of about 20 to about 40 parts by weight.

An optional, but preferred, ingredient of the present invention is cork powder. Preferably, the cork powder has a particle size of about 75$\mu$. The cork powder may be added in quantities from about 0 parts by weight to about 15 parts by weight, with the preferred amount being about 10 parts by weight.

The sealing compound may be made in any conventional manner. The various ingredients are randomly mixed together to create a blended homogenous compound. The compound can be mixed in a standard mixer, such as a Banbury mixer or in any other type of mixer or blender which is normally used for making sealing compounds.

Preferably, the compound is made by an extrusion/molding technique in which the ingredients are fed in the correct proportions to the head of the extruder which extrudes the formed compound.

Once the compound has been formed it may be used in any manner similar to those currently in use with PVC-based compounds. For example, dry mixture having a powder-like consistency can be used and can be processed into webs or sheets under the effect of pressure. These webs of sheets are then cut into small plates or disks which can be introduced into closures as liners. These liners are preferably die punched into the final shape of the seal. Likewise, the dry mixture may be introduced directly into the closure and suitably heated and compressed by a forming die into the desired shape.

Preferably, the compound is extruded into pellets which are then placed into the closures and formed into seals with a die. Examples of such a process are well known in the PVC area, as evidenced by U.S. Pat. Nos. 3,696,956 and 3,883,025. These processes are as equally well suited for the present sealing compound.

Another preferred process is to extrude the compound in a tape form and cut plates or disks out of the tape of use as liners.

The sealing compounds of the present invention are particularly suitable for use in container closures, preferably bottle closures, such as crowns, rolled on caps and twist on caps. Such closures can be made from tin plate, sheet steel or aluminum or plastic.

The following examples are presented to show the various types of compounds which can be made under the present invention. These examples are for illustration only and are not intended in any way to limit the scope of the present invention.

EXAMPLE 1

A compound of the present invention was made of 85 parts by weight of low density polyethylene having a melt index of 7; 15 parts by weight of a styrene-isoprene-styrene block copolymer, sold under the tradename EUROPRENE SOL T 190 by Enichem; and 40 parts by weight of talc having a particle size of 75$\mu$. The compound was mixed and extruded into pellet form and formed in a closure by a cold die. The sealing characteristics of the compound equalled those of the presently available PVC-based compounds.

EXAMPLE 2

A compound formed similar to that of Example 1, except linear low density polyethylene was used instead. The seals formed by the compound showed very good sealing characteristics.

EXAMPLE 3

A compound of 85 parts by weight of low in density polyethylene, 15 parts by weight elastomeric alloy, having a Shore A hardness of 58, a vinyl acetate content of 10% and sold under the tradename ESCORENE ULTRA EX 095, and 40 parts by weight talc, similar to that of Example 1, was formed into seals and showed characteristics similar to those of Example 1.

EXAMPLE 4

A compound of 85 parts by weight of low density polyethylene; 15 parts by weight of elastomeric alloy, having the same properties as that in Example 3, 40 parts by weight talc; and 10 parts by weight of cork powder formed seals with sealing characteristics similar to those of PVC-based compounds.

While this invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

What I claim is:

1. A sealing compound comprising:
   (a) from about 75 to about 95 parts by weight of polyethylene;
   (b) from about 10 to about 20 parts by weight of a thermoplastic elastomeric mixture of an ethylene-propylene copolymer and ethylene vinyl acetate copolymer and process oil; and
   (c) from about 15 to about 50 parts by weight of one or more fillers.

2. A sealing compound of claim 1 wherein the polyethylene is selected from the group consisting of low density polyethylene and linear low density polyethylene.

3. A sealing compound of claim 1 wherein the ethylene-propylene copolymer is selected from the group consisting of EPM and EPDM.

4. A sealing compound of claim 1 wherein the one or more fillers are selected from the group consisting of talc, calcium carbonate, kaolin, cork powder, titanium dioxide and mixtures thereof.

5. The sealing compound of claim 1 wherein the amount of polyethylene is 85 parts by weight, the amount of thermoplastic elastomeric mixture is 15 parts by weight, and the amount of one or more fillers is 20 to 40 parts by weight.

6. A sealing compound of claim 4 wherein the amount of cork powder is 10 parts by weight.

7. In a process for forming a container closure seal comprising extruding a pellet of sealing compound into the closure and mechanically deforming the pellet to form the seal, an improvement comprising a PVC-free sealing compound of:
   (a) from about 75 to about 95 parts by weight of a polyethylene selected from the group consisting of low density polyethylene and linear low density polyethylene,
   (b) from about 10 to about 20 parts by weight of a thermoplastic elastomeric mixture of ethylene vinyl acetate copolymer, process oil and an ethylene-propylene copolymer selected from the group consisting of EPM and EDPM,
   (c) from about 15 to about 50 parts by weight of one or more fillers.

8. The improvement of claim 7 wherein the one or more fillers is selected from the group consisting of talc, calcium carbonate, kaolin, titanium dioxide, cork powder and mixtures thereof.

9. The improvement of claim 8 wherein the one or more fillers comprise of from about 0 to about 15 parts by weight of cork powder and from about 15 to about 35 parts by weight of other fillers.

* * * * *